United States Patent [19]

Yoon

[11] Patent Number: 5,223,132
[45] Date of Patent: Jun. 29, 1993

[54] WATER FILTERING APPARATUS

[75] Inventor: Deok J. Yoon, Suweon, Rep. of Korea

[73] Assignee: Samsung Electronics Co., Ltd., Suweon, Rep. of Korea

[21] Appl. No.: 711,896

[22] Filed: Jun. 7, 1991

[30] Foreign Application Priority Data

Jun. 11, 1990 [KR] Rep. of Korea .................. 90-8192

[51] Int. Cl.⁵ ............................................. B01D 27/08
[52] U.S. Cl. .................................. 210/232; 210/264; 210/282; 210/416.3; 210/510.1
[58] Field of Search ............... 210/232, 238, 259, 264, 210/282, 287, 316, 317, 416.3, 510.1

[56] References Cited

U.S. PATENT DOCUMENTS

| | | |
|---|---|---|
| 3,950,253 | 4/1976 | Stern . |
| 4,997,562 | 3/1991 | Warner ............................... 210/259 |
| 5,004,535 | 4/1991 | Basko et al. ......................... 210/259 |
| 5,064,534 | 11/1991 | Busch et al. ...................... 210/510.1 |
| 5,069,782 | 12/1991 | Moyher et al. ..................... 210/259 |
| 5,078,864 | 1/1992 | Whittier ............................. 210/259 |

Primary Examiner—Robert A. Dawson
Assistant Examiner—W. L. Millard
Attorney, Agent, or Firm—Burns, Doane, Swecker & Mathis

[57] ABSTRACT

A water filtering apparatus includes a filter unit, a container and a support member. The filter unit includes three filters which perform different filtering functions. One of the filters, which includes a filter membrane, has a flow control valve at the bottom thereof. The container has a connecting member which permits the filter unit to be connected to the container and an open and close member which is closed only when the container is separated from the remainder of the apparatus for purposes of transportation.

20 Claims, 5 Drawing Sheets

WATER FILTERING APPARATUS

FIELD OF THE INVENTION

The present invention pertains to a filtering apparatus for filtering tap water supplied from a faucet. More particularly, the present invention relates to a filtering apparatus that includes a filter unit for treating and purifying tap water with a reverse osmosis process and a separable container for storing the treated and purified water.

BACKGROUND OF THE INVENTION

As a result of pollution brought about by industrial development, the contamination of water sources has reached a very serious level. Even though tap water supplied to homes is usually sterilized and filtered at a main water supply area, the tap water from the faucet can still contain a significant amount of contaminants. Thus, it is oftentimes undesirable to use the tap water directly from the faucet. It can be appreciated, therefore, that a need exists for improving the quality and cleanliness of tap water.

Moreover, due to the water pollution found in many rivers, it can be difficult to obtain purified water out in the field. Thus, there also exists a need for obtaining purified water out in the field.

To address the foregoing needs, a filtering apparatus was developed to produce purified water at home or in the field. Such a typical filtering apparatus is disclosed in U.S. Pat. No. 3,950,253. The filtering apparatus disclosed therein includes a reservoir for storing untreated water and a container including a pump for pumping water from the bottom of the reservoir. An outlet is provided and is connected to the inlet of a filter device located within the container. A filter device having an integral outlet spout for discharging the filtered water over the upper edge of the container is also provided. The filter device has two different charcoal filters disposed therein.

Such an apparatus is disadvantageous in that power must always be applied to the pump in order to pump untreated water into the filter device. Moreover, the volume of the apparatus is restricted when the apparatus is used with the pump in the field. Further, the aforementioned apparatus is problematic in that it is difficult to filter out microscopic bacteria and virus when only charcoal is employed in the filter device.

SUMMARY OF THE INVENTION

One of the objects of the present invention, therefore, is to provide a filtering apparatus for solving the aforementioned problems.

Another object of the present invention is to provide a filtering apparatus which can be connected to the faucet and which is able to filter sediment through the use of the faucet pressure and without the need for any other particular power.

An additional object of the present invention is to provide a filtering apparatus that includes a filter unit which is capable of producing a large amount of purified water and a portable container for receiving purified water from the filter unit, wherein the filter unit and the container are separable from each other.

Another object of the present invention is to provide a filtering apparatus that combines a membrane filter with a filter that functions through reverse osmosis, thereby helping to ensure that virus and bacteria are filtered out while at the same time allowing sufficient filtered water to be obtained.

To achieve at least the foregoing objects, the present invention includes a filter unit for treating faucet water fed through a faucet by faucet pressure, a container for storing water filtered by the filter unit and a support member for supporting the filter unit and the container.

According to one aspect of the present invention, the filter unit includes at least three filters that are generally columnar in shape and vertically arranged. The filters are located in a column and each of the filters performs an individual filtering function. The filter unit is able to filter minute sediments in the tap water, particularly virus and bacteria, by use of a membrane filter and a reverse osmosis process.

According to another aspect of the present invention, the container includes a connecting member at the upper end portion thereof. The connecting member is inserted into a packing having a supply hose which supplies tap water and a discharge hose which discharges overflow water from the container. The container also includes an opening and closing member at the bottom end portion thereof. The opening and closing member is opened when discharging purified water from the container and is closed when the container is being transported. Thus, purified water can be emptied from the container after being transported only by providing a water-supply member that cooperates with the opening and closing member.

The support member includes a water-supply valve mounted at the front upper portion thereof. The water-supply valve is adapted to selectively permit and prevent purified water from flowing therethrough when the container is connected to the upper surface of the support member.

The present invention is able to provide sufficient filterability through use of the filter unit functioning under faucet pressure. Thus, there is no need for an additional power source to operate the filtering apparatus. Also, the container is readily portable and can be carried away to where purified water is needed. Further, it is possible to separate the container from the filter unit.

BRIEF DESCRIPTION OF THE DRAWINGS

The present invention will be described in greater detail with reference to the accompanying drawings, in which like elements bear like reference numerals and wherein.

DETAILED DESCRIPTION OF THE PREFERRED EMBODIMENT

Figure 1:
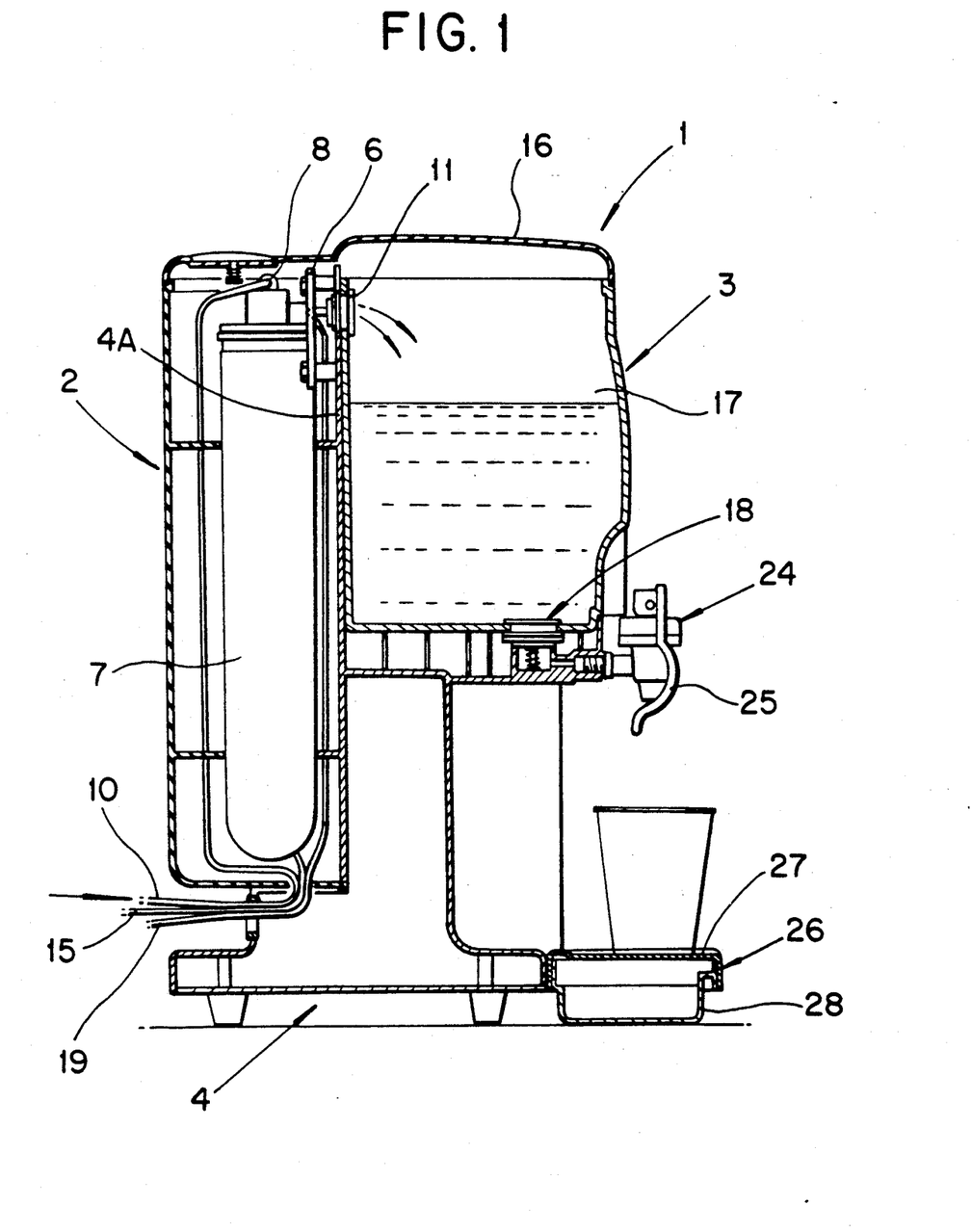
FIG. 1 is a cross-sectional side view of the water filtering apparatus according to the present invention.

Turning initially to FIG. 1, the features of the water filtering apparatus 1 according to a preferred embodiment for treating water from a faucet and for storing purified water will be described.

The water filtering apparatus 1 includes a filter unit 2 for treating untreated water. Preferably, the water flows into the filter unit 2 directly from a faucet (not shown). The apparatus 1 also includes a container 3 for storing water purified by the filter unit 2, and a support member 4 for supporting the filter unit 2 and the container 3 which are coupled to one another.

Figure 2:
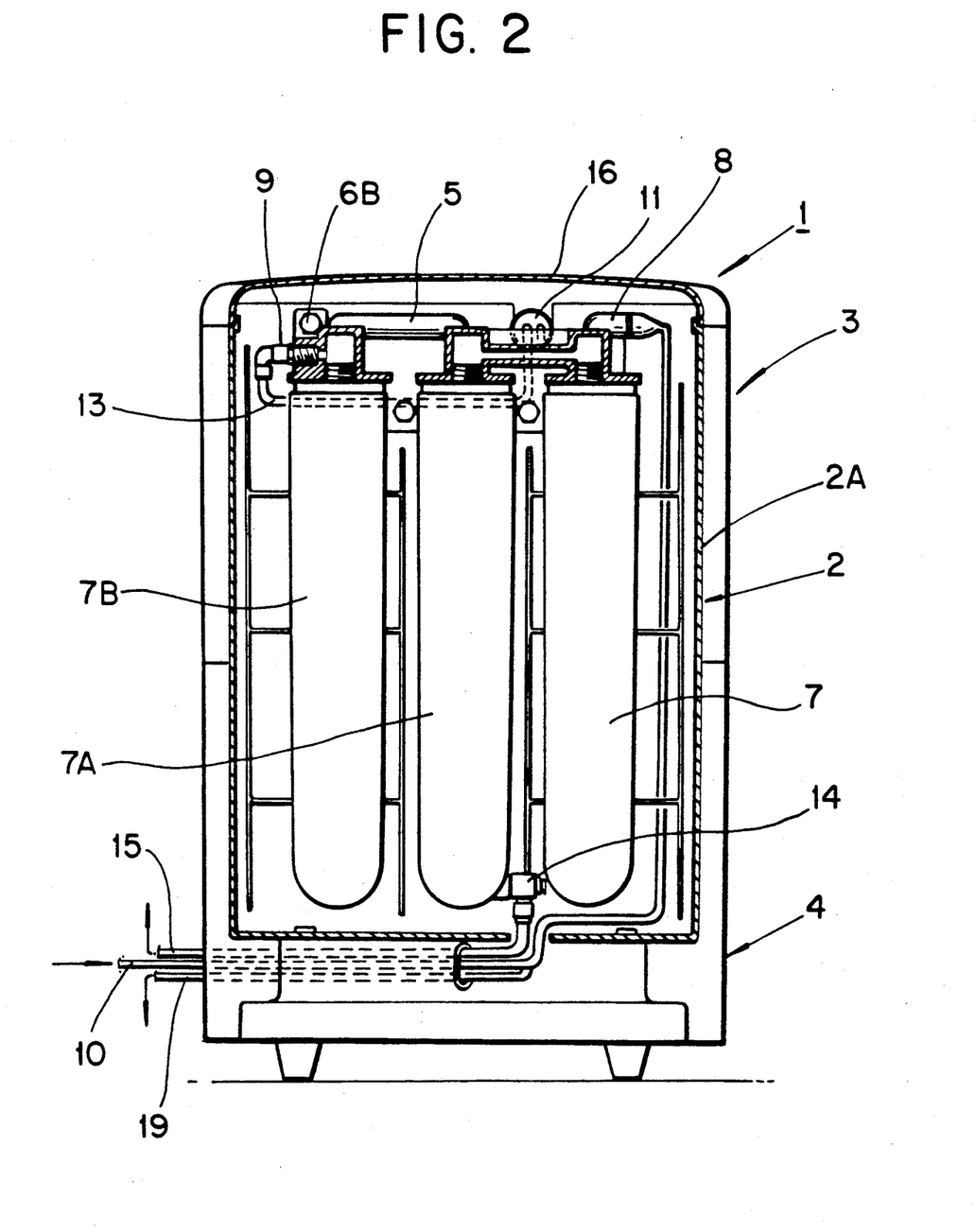
FIG. 2 is a cross-sectional view of the water filtering apparatus embodying the present invention.
Figure 3:
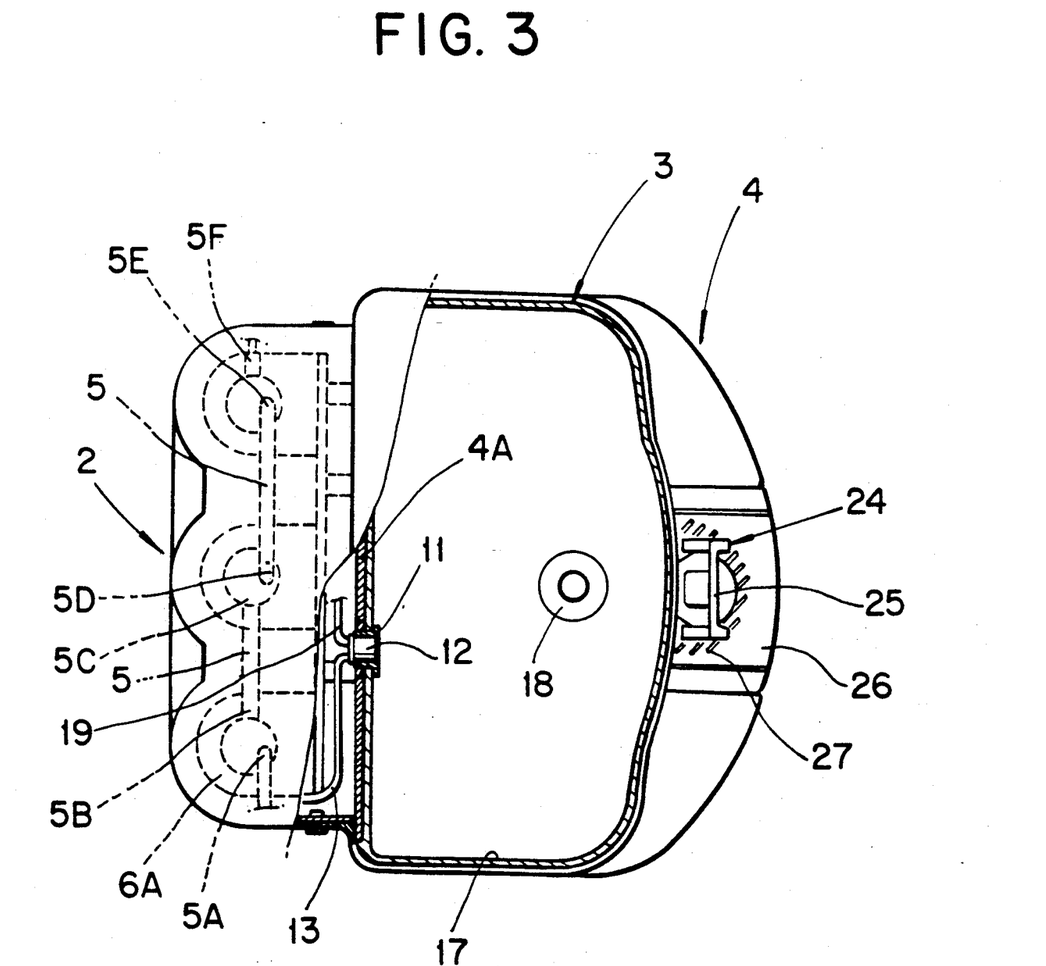
FIG. 3 is a plan view, partially in section, of the water filtering apparatus embodying the present invention.

The filter unit 2 includes a bracket member 6 (see FIGS. 1-3), which is contained within an integrally formed body 2A of the filter unit 2, and three purification filters 7, 7A, 7B which can be fastened and unfastened individually or as a unit to a single bracket member 6.

The bracket member is provided with a cover 6A which is individually connected to the purification filters 7A, 7B, 7C. The cover 6A has inlet openings 5A, 5C, 5E and outlet openings, 5B, 5D, 5F in the upper portion thereof.

A water passage 5 is provided for connecting outlet opening 5B to inlet opening 5C and for connecting outlet opening 5D to inlet opening 5F.

The inlet opening 5A is positioned adjacent an inlet hose 8 which receives untreated water through a supply hose 10 of a faucet. The outlet opening 5F is positioned adjacent an outlet hose 9 which discharges water that has been treated by the purification filters 7, 7A, 7B. The bracket member 6 is mounted on the sidewall 4A of the support member 4 (as will be described in more detail later) by bolt 6B.

The purification filters 7, 7A, 7B are shaped as cylindrical columns with open tops and are closely coupled to the bottom part of the cover 6A. The first filter 7 is a ceramic filter acting as a sieve for filtering sediment and chlorine. The second filter 7A is a membrane filter comprising celluloid for filtering virus and bacteria by reverse osmosis. The third filter 7B is an active charcoal filter for removing odor.

Additionally, at the lower portion of the second filter 7A a flow control valve 14 is provided. Impurities are accumulated little by little as water flows from one end of the membrane in the second filter 7A to the other end of the membrane in the second filter 7A. The accumulated impurities are then discharged outside the filtering apparatus by means of a discharge hose 15 connected to the flow control valve 14. As noted, the first filter 7 is disposed adjacent to the inlet hose 8, the third filter 7B is positioned adjacent to the outlet hose 9, and the second filter 7A is positioned between the first filter 7 and the third filter 7B. Thus, the purification filters 7, 7A, 7B are successively and commonly arranged on the bracket member 6.

The container 3 includes a water container portion 17 having a cover 16 for covering the upper open portion thereof, a connecting member 11 disposed on the rear upper portion of the water container 17, and an opening and closing member 18 which is fluidly connected to the valve 24 of the support member 4. The support member 4 will be described in more detail below. The opening and closing member 18 is disposed at a predetermined place on the lower portion of the water container 17.

Figure 4:
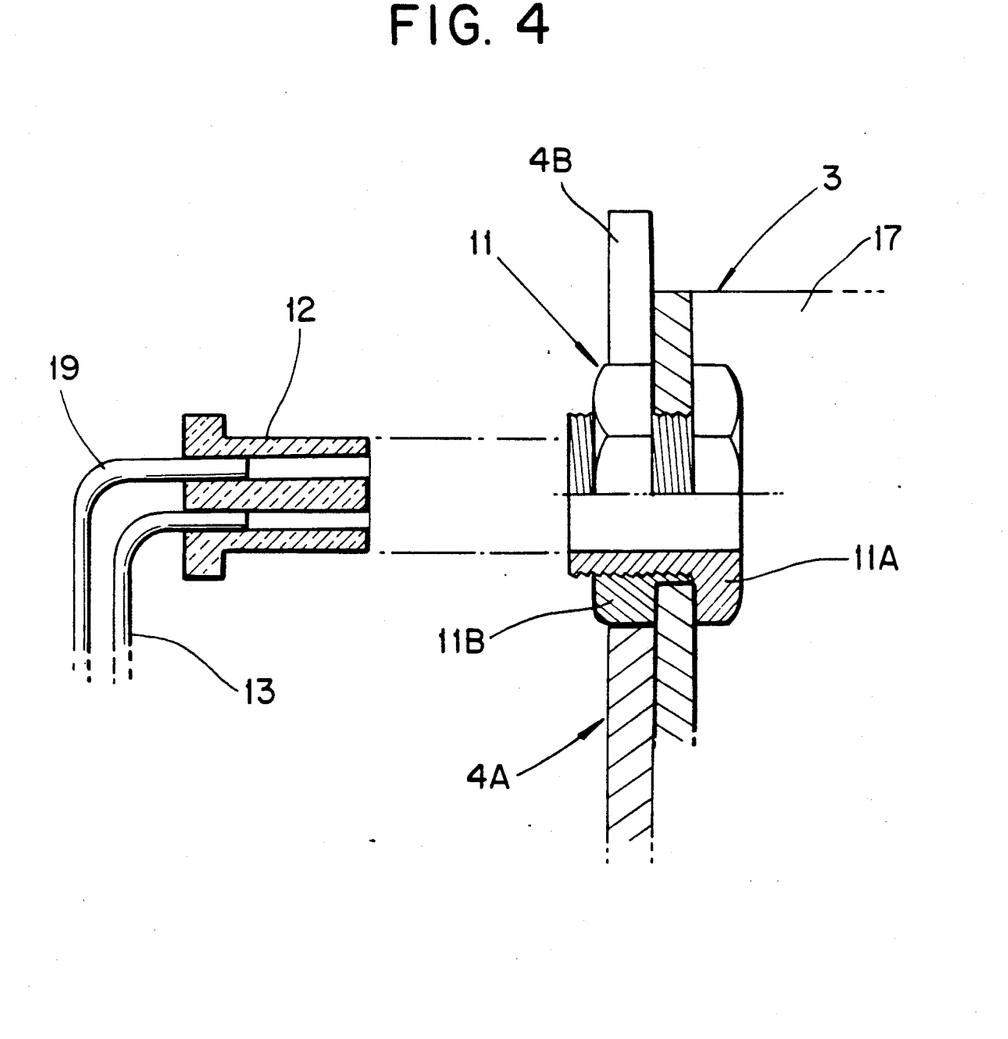
FIG. 4 is a cross-sectional view of the connecting member employed in the filtering apparatus according to the present invention.

The details of the connecting member 11 can be seen with reference to FIG. 4. The connecting member 11 includes a bolt 11A having a passage which receives a packing 12, and a nut 11B which threadably engages the bolt 11A. The packing 12 is formed so as to permit a supply hose 13 and a discharge hose 19 to be inserted therein or removed therefrom. The supply hose 13 is connected to the outlet hose 9 at a generally central portion of the packing 12. The discharge hose 19 discharges overflowing water out of the water container 17 when a predetermined excess volume of water in the water container 17 is reached. The nut 11B is formed so as to permit the connecting member 11 to be placed on an indentation cut in the sidewall 4A.

Figure 5:
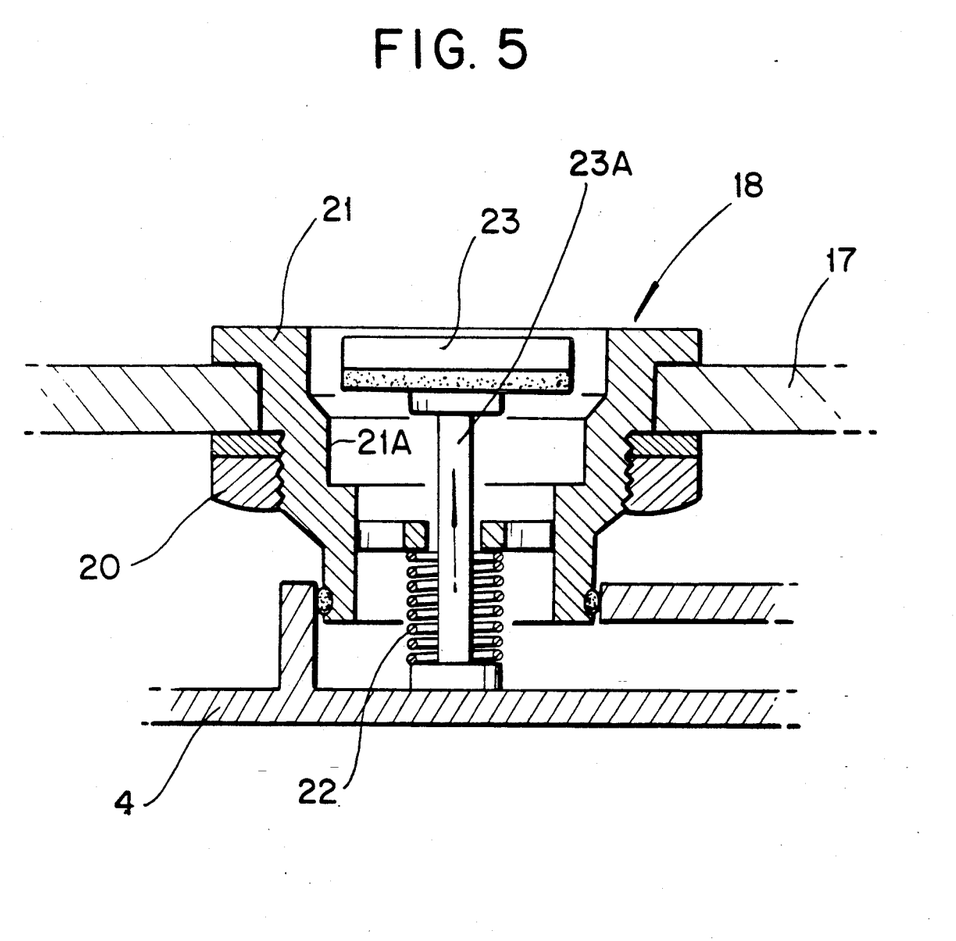
FIG. 5 is a cross-sectional view of the opening and closing member employed in the filtering apparatus according to the present invention.

The features pertaining to the opening and closing member 18 can be seen with reference to FIG. 5. The opening and closing member 18 includes a coupling 21 fastened by a nut 20 to a bottom portion of the water container 17. The coupling 21 includes a valve 23 urged by a spring 22 inside the coupling 21. When the container member 3 is positioned so as to be coupled to the filter member 2, the stem 23A which is integrally formed with the valve 23 contacts the support member 4 and thus, the valve 23 is urged upwardly. Consequently, the opening and closing member 18 is opened. When the container 3 is disassembled or separated from the support member 4, the stem 23A moves downwardly as a result of the tension force of the spring 22 and thus, the valve 23 is moved into a lower portion 21A of the coupling 21, thereby closing the opening and closing member 18.

Referring to FIG. 1 in which the support member 4 is shown, the support member 4 includes a valve 24 through which purified water from the water container 17 can be discharged at the front upper portion of the support member 4. The valve 24 is connected to a handle 25 which can be operated forwardly and backwardly to alternately prevent and permit water flow.

The support member 4 is configured such that an upper front portion of the support member 4 contacts the circumferential region of the coupling 21 provided on the opening and closing member 18 and contacts the bottom portion of the stem 23A. Also, at the base portion of the support member 4 located under the valve 24, a relatively small ledge 26 is provided for catching water droplets. A plurality of through slots 27 which communicate with an underlying drawer 28 are provided on the ledge 26.

A sidewall 4A forms a part of the front portion of the filter unit 2. The sidewall 4A extends integrally from the upper rear portion of the support member 4 adjacent the rear portion of container 3. The container member 3 is separable from the filter unit 2.

Additionally, a rounded indentation 4B is formed at the upper end of the side wall 4A. The connecting member 11 of the container 3 is placed onto or is pulled upwardly from the indentation 4B of the sidewall 4A and thus, the indentation 4B (FIG. 4) is formed to generally correspond to the shape of connecting member 11.

The water filtering apparatus according to the present invention and including the above features operates as follows.

Initially, the supply hose 10 of the filter unit 2 is coupled to an adaptor on a faucet (not shown). When the faucet is opened or turned on, untreated tap water flows into the inlet opening 5A in the bracket member 6 through the supply hose 10 and through the inlet hose 8 which is disposed closely adjacent the first filter 7. The tap water flows under tap water pressure into the inlet opening 5A and passes through the interior of the first filter 7 to filter out sediment and chlorine. Then, treated water from the first filter 7 flows out through the outlet opening 5B and passes into the second filter 7A through the inlet opening 5C. As the water flows along the outside of the membrane, virus and bacteria having a magnitude greater than the size of the pores in the membrane are filtered out by reverse osmosis. Then, treated water from the second filter 7A flows out through the outlet opening 5D and passes into the third filter 7B through the inlet opening 5E. The charcoal in the third filter 7B is adapted to remove odor. As a result, purified water is obtained.

Purified water that has successively passed through the filters 7, 7A, 7B is fed to the discharge hose 9 which is formed at the end of the outlet opening 5F and then to the supply hose 13 which is connected to the discharge hose 9. Thus, the purified water is directed into and stored in the water container portion 17 of the container 3.

Purified water stored in the water container portion 17 can be selectively discharged through the valve 24 which is opened through operation of the handle 25 positioned on the support member 4.

As purified water is being discharged or emptied from the water container 17, water is being fed from the membrane inlet in the second filter 7A to the membrane outlet in the second filter 7A, whereby impurities are collected and exhausted outside the filtering apparatus via the discharge hose 15.

The container member 3 can be selectively detached from and attached to the filter unit 2 and the support member 4. That is, when the container 3 must be detached from the support member 4 for transportation or other purposes, the packing 12 inserted in the connecting member 11 is disassembled from the connecting member 11 and the opening formed in the connecting member 11 for receiving the packing 12 is covered with a cover member (not shown) having a shape similar to that of the packing 12. The container 3 can then be pulled upwards from the support member 4, thereby allowing the container 3 to be carried to where purified water is needed.

To discharge water from the container 3 when the container 3 is detached from the support member 4, a faucet (not shown) having an adaptor (not shown) can be connected to the opening and closing member 18 in the container 3. Such an adaptor interacts with the opening and closing member 18 to open the opening and closing member 18 and performs a function similar to the function performed by the valve 24 deposited on the support member 4. Purified water can then be discharged from the container 3 via the faucet which has such an adaptor. That is, the faucet having such an adaptor opens the opening and closing member 18 in the container 3 and controls the feed volume of the purified water.

When it is necessary to mount the container 3 on the support member 4, the container 3 is placed on the top surface of the support member 4. Thus, as shown in FIG. 5, the stem 23A of the valve 23 contacts the top surface of the support member 4 and is moved upwardly, thereby opening the opening and closing member 18.

Additionally, as seen in FIG. 4, the connecting member 11 is placed in an indentation cut in the side wall 4A and the connecting member 11 receives the packing 12.

Purified water fed continuously into the container 3 can be discharged or emptied therefrom by the valve 24. When purified water is not being used, water which is filled up above a level of the connecting member 11 is exhausted through the exhaust hose 19 and to the outside of the filtering apparatus 1. The user can detect the overflow of water and can appropriately control the amount of water flowing out of the faucet.

It can be seen, therefore, that the water filtering apparatus according to the present invention permits the water to be more effectively filtered as a result, at least in part, of the reverse osmosis. Thus, it is possible to obtain well purified water. Moreover, the separable and portable nature of the water container relative to the rest of the apparatus increases the convenience and usefulness of the water filtering apparatus according to the present invention.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations, changes and equivalents may be made by others without departing from the spirit of the present invention. Accordingly, it is expressly intended that all such variations, changes and equivalents which fall within the spirit and scope of the present invention as defined in the claims, be embraced thereby.

What is claimed is:

1. A water filtering apparatus comprising: a filter unit for filtering and purifying untreated water that is discharged from a faucet, said filter unit including at least three purification filters which are mounted on a bracket member positioned in a body of the filter unit, a first one of the filters having an inlet for permitting water to flow into the first filter and an outlet, a second one of the filters having an inlet and an outlet and a third one of the filters having an inlet and an outlet, the inlets and outlets of the first, second and third filters being connected to one another such that water flowing into the first filter will successively pass through the first, second and third filters and be subjected to successive filtering operations to thereby produce purified water;

a support member having a discharge valve for permitting purified water to be discharged from the apparatus;

a container removably mounted on the support member and fluidly connected by way of a connecting member to the filter unit for storing the water treated and purified by the filter unit, said container being provided with an opening and closing member for permitting purified water to be discharged from the container when the container is mounted on the support member and for preventing the discharge of purified water from the container when the container is separated from the support member, said container including means for permitting water to be discharged from the container when the volume of water in the container reaches a predetermined level, said opening and closing member being in fluid communication with said discharge valve, whereby said container can be removed from said support member so as to permit purified water contained in the container to be transported.

2. The water filtering apparatus according to claim 1, wherein said first filter includes a ceramic filter for filtering sediment and chlorine from the water, said second filter including a membrane filter for filtering virus and bacteria from the water through reverse osmosis and said third filter including a charcoal filter for removing odor.

3. The water filtering apparatus according to claim 2, including a flow control valve associated with the second filter, whereby impurities filtered by the second filter are stored in a bottom portion of the second filter and discharged outside the apparatus through the flow control valve.

4. The water filtering apparatus according to claim 1, wherein each of said first, second and third filters are arranged in columns and are adapted to filter different constituents from the water.

5. The water filtering apparatus according to claim 1, including a packing member disposed in the connecting member, said packing member having at least one supply hose connected thereto for supplying water from the filter unit to the container and at least one exhaust hose connected thereto for discharging water from the container, said at least one exhaust hose defining said means for permitting water to be discharged from the container when the volume of water in the container reaches a predetermined level.

6. The water filtering apparatus according to claim 5, wherein said packing member is removably disposed in the connecting member so that the packing member as well as the supply hose and exhaust hose can be disconnected from the connecting member when the container is separated from the support member to thereby permit the container to be transported.

7. The water filtering apparatus according to claim 1, wherein said opening and closing member includes a coupling disposed at a bottom portion of the container, a container valve movably positioned in the coupling between opened and closed positions and a spring for biasing the container valve in the closed position so as to prevent purified water from being discharged from the container when the container is separated from the support member, said container valve having a valve stem that projects beyond an end of the coupling so that when the container is mounted on the support member the valve stem contacts the support member to urge the container valve into the open position for permitting water to be discharged from the container.

8. The water filtering apparatus according to claim 1, wherein said opening and closing member is adapted to be connected to a faucet outfitted with an adapter so that the purified water in the container can be discharged from the container when the container is separated from the support member.

9. A water filtering apparatus comprising: a filter unit for filtering and purifying water, said filter unit including a plurality of purification filters, a first one of the filters including an inlet for permitting water to flow into the first filter, said filter unit also including means for fluidly connecting the plurality of filters to one another so that water flowing into the first filter will successively pass through the plurality of filters and be subjected to successive filtering operations to thereby produce purified water;
a support member, said support member including means for selectively permitting and preventing the discharge of purified water from the apparatus;
a container removably mounted on the support member for storing purified water that has been purified by the filter unit and for permitting the container and purified water contained therein to be transported separate from the filter unit and the support member, said container including means for fluidly communicating a last one of the filters with the container so that water purified by the filter unit can flow into the container, said container including opening and closing means for preventing the discharge of purified water from the container when the container is separated from the support member and for permitting the discharge of purified water from the container when the container is mounted on the support member, said opening and closing means being fluidly connected to the means for selectively permitting and preventing the discharge of purified water from the apparatus.

10. The water filtering apparatus according to claim 9, wherein each of said purification filters includes means for performing a filtering function different from the other filters.

11. The water filtering apparatus according to claim 9, wherein said plurality of purification filters includes at least first, second and third purification filters, said first purification filter including a ceramic filter for filtering sediment and chlorine, a membrane filter in said second filter for filtering virus and bacteria through the use of reverse osmosis, and said third purification filter including a charcoal filter in said third filter for removing odor.

12. The water filtering apparatus according to claim 9, wherein said opening and closing means includes a coupling positioned in a lower portion of said container, a valve positioned in the coupling and a spring for biasing the valve in a closed positioned so as to prevent purified water from being discharged from the container when the container is separate from the support member, said valve including a valve stem that projects beyond an end of the coupling under the biasing force of the spring so that when the container is mounted on the support member the valve stem contacts the support member to urge the valve to an open position for permitting water to be discharged from the container.

13. The water filtering apparatus according to claim 9, wherein said means for fluidly communicating a last one of the filters with the container includes a connecting member disposed in an upper portion of the container, said connecting member having a through hole formed therein.

14. The water filtering apparatus according to claim 13, wherein a side wall of said support member is provided with an indentation, said connecting member being positioned in said indentation for mounting the container on the support member.

15. The water filtering apparatus according to claim 13, wherein said means for fluidly communicating a last one of the filters with the container includes a supply hose positioned in a packing for supplying purified water from the filter unit to the container, said packing being disposed in the through hole in the connecting member when the container is mounted on the support member.

16. The water filtering apparatus according to claim 15, including a discharge hose positioned in the packing for permitting water in excess of a predetermined amount in the container to be discharged from the container.

17. A water filtering apparatus for directly purifying tap water from a faucet, comprising: a plurality of fluidly communicated filtration devices arranged in series, said plurality of water filtration devices including a first filtration device having means for filtering sediment and chorine from tap water, a second filtration device having means for filtering viruses and bacteria from tap water, and a third filtration device having means for removing odor from tap water, wherein said means for filtering sediment and chlorine includes a ceramic filter, said means for filtering viruses and bacteria including a membrane filter that operates through reverse osmosis to remove viruses and bacteria, said membrane filter including celluloid, said means for removing odor including a charcoal filter which removed odor through reverse osmosis.

18. The water filtering apparatus according to claim 17, wherein said first, second and third filtration devices define a filter unit, and including a support member having means for selectively permitting and preventing the discharge of filtered water from the apparatus, and a container for storing filtered water that has been filtered by the filter unit, said container including means for fluidly communicating one of the first, second and third filtration devices with the container, said container including opening and closing means for preventing the discharge of filtered water from the container when the container is separated from the support member and for permitting the discharge of filtered water from the container when the container is mounted on the support member, said opening and closing means being fluidly connected to the means for selectively permitting and preventing the discharge of filtered water from the apparatus.

19. A water filtering apparatus for purifying tap water directly from a faucet, comprising: a water filtration unit and means for directing the tap water to be purified through the water filtration unit, said water filtration unit including a membrane filter that operates through reverse osmosis for filtering and removing viruses and bacteria from the tap water, wherein said means for directing the tap water through the water filtration unit includes said apparatus being constructed so that tap water can be directed through the water filtration unit by the faucet pressure of the tap water discharged from a faucet, wherein said water filtration unit includes a separate ceramic filter for filtering and removing sediment and chlorine, and a separate charcoal filter for removing odor.

20. A water filtering apparatus for directly purifying tap water from a faucet, comprising: a plurality of fluidly communicated filtration devices arranged in series, said plurality of water filtration devices including a first filtration device having means for filtering sediment and chorine from tap water, a second filtration device having means for filtering viruses and bacteria from tap water, and a third filtration device having means for removing odor from tap water, wherein said first, second and third filtration devices define a filter unit, and including a support member having means for selectively permitting and preventing the discharge of filtered water from the apparatus, and a container for storing filtered water that has been filtered by the filter unit, said containing including means for fluidly communicating one of the first, second and third filtration devices with the container, said container including opening and closing means for preventing the discharge of filtered water from the container when the container is separated from the support member and for permitting the discharge of filtered water from the container when the container is mounted on the support member, said opening and closing means being fluidly connected to the means for selectively permitting and preventing the discharge of filtered water from the apparatus.

* * * * *